No. 781,129. PATENTED JAN. 31, 1905.
D. W. CALL.
HUB BAND.
APPLICATION FILED OCT. 1, 1904.

WITNESSES
Warren W. Swartz
H. M. Corwin

INVENTOR
D. W. Call
by Bakewell Byrnes
his Attorneys

No. 781,129. Patented January 31, 1905.

UNITED STATES PATENT OFFICE.

DELMER W. CALL, OF CLEVELAND, OHIO, ASSIGNOR TO THE NATIONAL MALLEABLE CASTINGS COMPANY, OF CLEVELAND, OHIO, A CORPORATION OF OHIO.

HUB-BAND.

SPECIFICATION forming part of Letters Patent No. 781,129, dated January 31, 1905.

Application filed October 1, 1904. Serial No. 226,726.

*To all whom it may concern:*

Be it known that I, DELMER W. CALL, of Cleveland, Cuyahoga county, Ohio, have invented a new and useful Hub-Band, of which the following is a full, clear, and exact description, reference being had to the accompanying drawings, forming part of this specification, in which—

Figure 1:
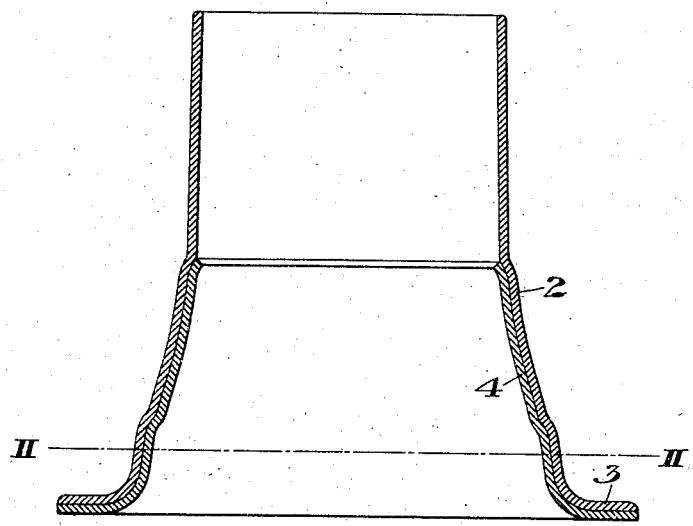
Figure 2:
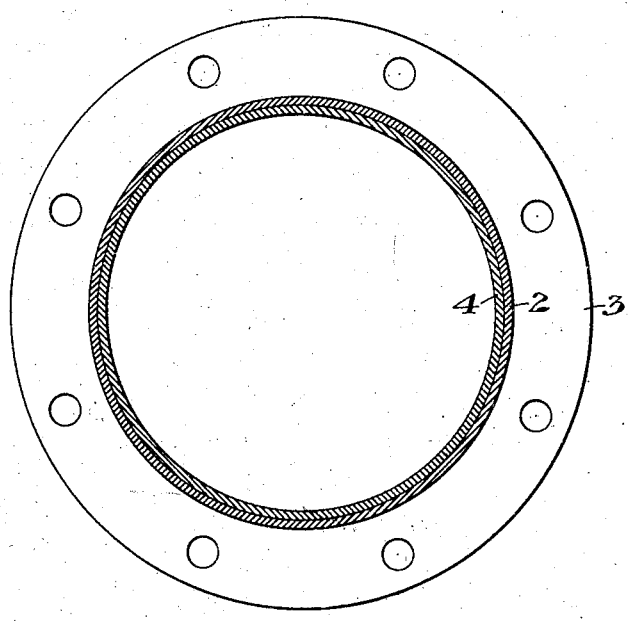

Figure 1 is an axial section of a hub-band constructed in accordance with my invention, and Fig. 2 is a cross-section on the line II II of Fig. 1.

The purpose of my invention is to provide means for making a strong and satisfactory vehicle-hub band of drawn sheet metal that shall combine the desirable features of lightness and smoothness of finish with rigidity and strength, which will enable it to constitute part of a strong and rigid wheel.

As shown in the drawings, my hub-band is made of a metal shell 2, which is drawn from sheet-steel and has an outwardly-extending base-flange 3. It is reinforced by a metal sleeve 4, which may be of drawn sheet metal or may be a casting, and is forced with pressure into the interior of the hub-band at the larger flanged end thereof, thus reinforcing the metal not only at the flanged end of the band, but also within the circumference of the band. This reinforcing-piece may be extended to any desired distance within the hub-band and being pressed into close contact therein affords a very strong and rigid construction, enabling the band to stand the severe stresses which are put upon it when it is applied to the hub of a vehicle.

The form of the hub-band may be varied in many ways, since

What I claim is—

1. A band for vehicle-hubs having an outwardly-extending flanged portion at the base or larger end, and having a reinforcing-sleeve fitting closely within the hub-inclosing portion of the band at the flanged base thereof; substantially as described.

2. A sheet-metal band for vehicle-hubs having an outwardly-extending flanged portion at the base or larger end, and having a reinforcing-sleeve fitting closely within the hub-inclosing portion of the band at the flanged base thereof; substantially as described.

3. A band for vehicle-hubs having an outwardly-extending flanged portion at the base or larger end, and having a reinforcing-sleeve fitting closely within the hub-inclosing portion of the band at the flanged base thereof and fitting also against the outer end of the flanged portion; substantially as described.

In testimony whereof I have hereunto set my hand.

DELMER W. CALL.

Witnesses:
HARRY E. ORR,
O. W. LOOMIS.